US012081514B2

(12) United States Patent
Suzuki

(10) Patent No.: US 12,081,514 B2
(45) Date of Patent: Sep. 3, 2024

(54) COMMUNICATION CONTROL METHOD, COMPUTER SYSTEM, AND COMPUTER

(71) Applicant: Hitachi, Ltd., Tokyo (JP)

(72) Inventor: Kyuta Suzuki, Tokyo (JP)

(73) Assignee: HITACHI, LTD., Tokyo (JP)

(*) Notice: Subject to any disclaimer, the term of this patent is extended or adjusted under 35 U.S.C. 154(b) by 487 days.

(21) Appl. No.: 17/405,062

(22) Filed: Aug. 18, 2021

(65) Prior Publication Data
US 2022/0141178 A1 May 5, 2022

(30) Foreign Application Priority Data
Nov. 4, 2020 (JP) ................................ 2020-184055

(51) Int. Cl.
*H04L 61/5046* (2022.01)
*G06F 9/455* (2018.01)
(Continued)

(52) U.S. Cl.
CPC ...... *H04L 61/5046* (2022.05); *G06F 9/45558* (2013.01); *G06F 9/5072* (2013.01);
(Continued)

(58) Field of Classification Search
None
See application file for complete search history.

(56) References Cited

U.S. PATENT DOCUMENTS

| 9,634,948 B2 * | 4/2017 | Brown .................... G06F 9/455 |
| 10,931,638 B1 * | 2/2021 | Pang ....................... H04L 63/20 |

(Continued)

FOREIGN PATENT DOCUMENTS

| CN | 109246162 A * | 1/2019 | ......... H04L 61/5046 |
| JP | 2013-5038 A | 1/2013 | |

(Continued)

OTHER PUBLICATIONS

Japanese Office Action received in corresponding Japanese Application No. 2020-184055 dated Sep. 20, 2022.

*Primary Examiner* — Charles E Anya
(74) *Attorney, Agent, or Firm* — MATTINGLY & MALUR, PC

(57) ABSTRACT

A computer system comprises cloud infrastructures including computers including a hypervisor manages a VM. The hypervisor includes a duplication correction virtual machine operating thereon, the duplication correction virtual machine controls communication of a duplication virtual machine to which a duplication MAC address assigned. Each of the cloud infrastructures includes a MAC address duplication monitoring module for monitoring duplication of the MAC address. The MAC address duplication monitoring module generates a translated MAC address in a case of detecting duplication of the MAC addresses; and transmits a duplication correction request including the translated MAC address to one of the computers on which the duplication virtual machine operates. The duplication correction virtual machine generates translation information in a case of receiving the duplication correction request, and controls communication between the duplication virtual machine and another virtual machine by using the translation information.

13 Claims, 26 Drawing Sheets

(51) Int. Cl.
*G06F 9/50* (2006.01)
*H04L 61/10* (2022.01)
*H04L 101/622* (2022.01)

(52) U.S. Cl.
CPC ...... *H04L 61/10* (2013.01); *G06F 2009/4557* (2013.01); *G06F 2009/45591* (2013.01); *G06F 2009/45595* (2013.01); *H04L 2101/622* (2022.05)

(56) References Cited

U.S. PATENT DOCUMENTS

| | | | |
|---|---|---|---|
| 2011/0238820 A1* | 9/2011 | Matsuoka | G06F 9/5077 709/224 |
| 2014/0044134 A1* | 2/2014 | Rajamanickam | H04L 61/5046 370/400 |
| 2014/0359114 A1* | 12/2014 | Takamure | G06F 9/45558 709/224 |
| 2015/0372854 A1* | 12/2015 | Furukawa | G06F 9/45558 709/223 |
| 2016/0105393 A1* | 4/2016 | Thakkar | H04L 67/125 709/220 |
| 2019/0089674 A1 | 3/2019 | Seino | |
| 2019/0387459 A1* | 12/2019 | McCann | H04W 8/26 |
| 2021/0067466 A1* | 3/2021 | Parab | H04L 49/3009 |

FOREIGN PATENT DOCUMENTS

| | | |
|---|---|---|
| JP | 2013-9261 A | 1/2013 |
| WO | 2017/170155 A1 | 10/2017 |

* cited by examiner

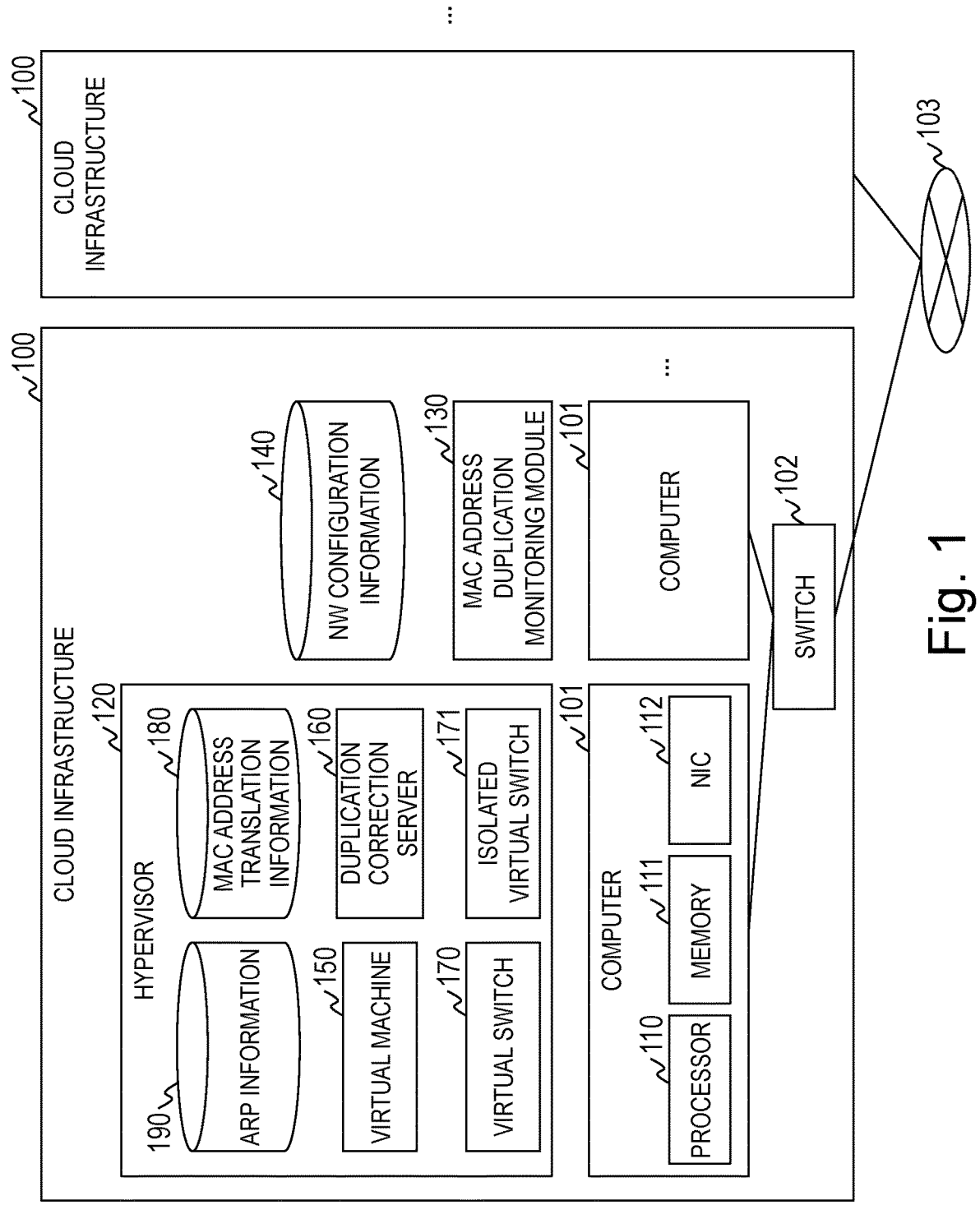

| ID 301 | CLOUD ID 302 | HYPERVISOR ID 303 | MAC ADDRESS 304 | TRANSLATED MAC ADDRESS 305 | VLAN ID 306 | VIRTUAL SW PORT ID 307 | ISOLATED VIRTUAL SW PORT ID 308 | IP ADDRESS 309 | RELATED ID 310 ← 140 |
|---|---|---|---|---|---|---|---|---|---|
| 0001 | 0002 | 0101 | MAC1 | - | 10 | 0101 | - | 192.168.1.101 | - |
| 0002 | 0002 | 0102 | MAC102 | - | 30 | 0102 | - | 192.168.100.102 | - |

Fig. 3B

| ID 301 | CLOUD ID 302 | HYPERVISOR ID 303 | MAC ADDRESS 304 | TRANSLATED MAC ADDRESS 305 | VLAN ID 306 | VIRTUAL SW PORT ID 307 | ISOLATED VIRTUAL SW PORT ID 308 | IP ADDRESS 309 | RELATED ID 310 |
|---|---|---|---|---|---|---|---|---|---|
| 0001 | 0001 | 0001 | MAC1 | - | 10 | 0001 | - | 192.168.1.1 | - |
| 0002 | 0001 | 0002 | MAC2 | - | 10 | 0002 | - | 192.168.1.2 | - |
| 0003 | 0001 | 0002 | MAC3 | - | 20 | 0003 | - | 192.168.2.3 | - |
| 0004 | 0002 | 0101 | MAC1 | - | 10 | 0101 | - | 192.168.1.101 | - |
| 0005 | 0002 | 0102 | MAC102 | - | 30 | 0102 | - | 192.168.100.102 | - |

Fig. 10A

| ID 301 | CLOUD ID 302 | HYPERVISOR ID 303 | MAC ADDRESS 304 | TRANSLATED MAC ADDRESS 305 | VLAN ID 306 | VIRTUAL SW PORT ID 307 | ISOLATED VIRTUAL SW PORT ID 308 | IP ADDRESS 309 | RELATED ID 310 |
|---|---|---|---|---|---|---|---|---|---|
| 0001 | 0001 | 0001 | MAC1 | MAC10 | 10 | 0001 | 0010 | 192.168.1.1 | 0004 |
| 0002 | 0001 | 0002 | MAC2 | - | 10 | 0002 | - | 192.168.1.2 | - |
| 0003 | 0001 | 0002 | MAC3 | - | 20 | 0003 | - | 192.168.2.3 | - |
| 0004 | 0002 | 0101 | MAC1 | MAC20 | 10 | 0101 | 0110 | 192.168.1.101 | 0001 |
| 0005 | 0002 | 0102 | MAC102 | - | 30 | 0102 | - | 192.168.100.102 | - |

Fig. 10C

| ID 401 | CLOUD ID 402 | HYPERVISOR ID 403 | MAC ADDRESS 404 | TRANSLATED MAC ADDRESS 405 | VLAN ID 406 | VIRTUAL SW PORT ID 407 | ISOLATED VIRTUAL SW PORT ID 408 | IP ADDRESS 409 |
|---|---|---|---|---|---|---|---|---|
| 0001 | 0001 | 0001 | MAC1 | MAC10 | 10 | 0001 | 0010 | 192.168.1.1 |

| ID 301 | CLOUD ID 302 | HYPERVISOR ID 303 | MAC ADDRESS 304 | TRANSLATED MAC ADDRESS 305 | VLAN ID 306 | VIRTUAL SW PORT ID 307 | ISOLATED VIRTUAL SW PORT ID 308 | IP ADDRESS 309 | RELATED ID 310 |
|---|---|---|---|---|---|---|---|---|---|
| 0001 | 0002 | 0101 | MAC1 | - | 10 | 0101 | - | 192.168.1.101 | - |
| 0002 | 0002 | 0102 | MAC102 | - | 30 | 0102 | - | 192.168.100.102 | - |
| 0003 | 0001 | 0001 | MAC1 | - | 10 | 0001 | - | 192.168.1.1 | - |
| 0004 | 0001 | 0002 | MAC2 | - | 10 | 0002 | - | 192.168.1.2 | - |
| 0005 | 0001 | 0002 | MAC3 | - | 20 | 0003 | - | 192.168.2.3 | - |

| 301 | 302 | 303 | 304 | 305 | 306 | 307 | 308 | 309 | 310 |
|---|---|---|---|---|---|---|---|---|---|
| ID | CLOUD ID | HYPERVISOR ID | MAC ADDRESS | TRANSLATED MAC ADDRESS | VLAN ID | VIRTUAL SW PORT ID | ISOLATED VIRTUAL SW PORT ID | IP ADDRESS | RELATED ID |
| 0001 | 0002 | 0101 | MAC1 | MAC20 | 10 | 0101 | 0110 | 192.168.1.101 | 0003 |
| 0002 | 0002 | 0102 | MAC102 | - | 30 | 0102 | - | 192.168.100.102 | - |
| 0003 | 0001 | 0001 | MAC1 | - | 10 | 0001 | - | 192.168.1.1 | 0001 |
| 0004 | 0001 | 0002 | MAC2 | - | 10 | 0002 | - | 192.168.1.2 | - |
| 0005 | 0001 | 0002 | MAC3 | - | 20 | 0003 | - | 192.168.2.3 | - |

Fig. 12B

| ID 301 | CLOUD ID 302 | HYPERVISOR ID 303 | MAC ADDRESS 304 | TRANSLATED MAC ADDRESS 305 | VLAN ID 306 | VIRTUAL SW PORT ID 307 | ISOLATED VIRTUAL SW PORT ID 308 | IP ADDRESS 309 | RELATED ID 310 |
|---|---|---|---|---|---|---|---|---|---|
| 0001 | 0002 | 0101 | MAC1 | MAC20 | 10 | 0101 | 0110 | 192.168.1.101 | 0003 |
| 0002 | 0002 | 0102 | MAC102 | - | 30 | 0102 | - | 192.168.100.102 | - |
| 0003 | 0001 | 0001 | MAC1 | MAC10 | 10 | 0001 | 0010 | 192.168.1.1 | 0001 |
| 0004 | 0001 | 0002 | MAC2 | - | 10 | 0002 | - | 192.168.1.2 | - |
| 0005 | 0001 | 0002 | MAC3 | - | 20 | 0003 | - | 192.168.2.3 | - |

Fig. 12C

| ID 401 | CLOUD ID 402 | HYPERVISOR ID 403 | MAC ADDRESS 404 | TRANSLATED MAC ADDRESS 405 | VLAN ID 406 | VIRTUAL SW PORT ID 407 | ISOLATED VIRTUAL SW PORT ID 408 | IP ADDRESS 409 |
|---|---|---|---|---|---|---|---|---|
| 0001 | 0002 | 0101 | MAC1 | MAC20 | 10 | 0101 | 0110 | 192.168.1.101 |

Fig. 13

| ID 301 | CLOUD ID 302 | HYPERVISOR ID 303 | MAC ADDRESS 304 | TRANSLATED MAC ADDRESS 305 | VLAN ID 306 | VIRTUAL SW PORT ID 307 | ISOLATED VIRTUAL SW PORT ID 308 | IP ADDRESS 309 | RELATED ID 310 |
|---|---|---|---|---|---|---|---|---|---|
| 0001 | 0001 | 0001 | MAC1 | MAC10 | 10 | 0001 | 0010 | 192.168.1.1 | 0004 |
| 0002 | 0001 | 0002 | MAC2 | - | 10 | 0002 | - | 192.168.1.2 | - |
| 0003 | 0001 | 0002 | MAC3 | MAC20 | 20 | 0003 | - | 192.168.2.3 | - |
| 0004 | 0002 | 0101 | MAC100 | - | 10 | 0101 | 0110 | 192.168.1.101 | 0001 |
| 0005 | 0002 | 0102 | MAC102 | - | 30 | 0102 | - | 192.168.100.102 | - |

Fig. 15A

| ID 301 | CLOUD ID 302 | HYPERVISOR ID 303 | MAC ADDRESS 304 | TRANSLATED MAC ADDRESS 305 | VLAN ID 306 | VIRTUAL SW PORT ID 307 | ISOLATED VIRTUAL SW PORT ID 308 | IP ADDRESS 309 | RELATED ID 310 |
|---|---|---|---|---|---|---|---|---|---|
| 0001 | 0001 | 0001 | MAC1 | - | 10 | 0001 | - | 192.168.1.1 | - |
| 0002 | 0001 | 0002 | MAC2 | - | 10 | 0002 | - | 192.168.1.2 | - |
| 0003 | 0001 | 0002 | MAC3 | - | 20 | 0003 | - | 192.168.2.3 | - |
| 0004 | 0002 | 0101 | MAC100 | MAC20 | 10 | 0101 | 0110 | 192.168.1.101 | - |
| 0005 | 0002 | 0102 | MAC102 | - | 30 | 0102 | - | 192.168.100.102 | - |

Fig. 15B

| ID 301 | CLOUD ID 302 | HYPERVISOR ID 303 | MAC ADDRESS 304 | TRANSLATED MAC ADDRESS 305 | VLAN ID 306 | VIRTUAL SW PORT ID 307 | ISOLATED VIRTUAL SW PORT ID 308 | IP ADDRESS 309 | RELATED ID 310 |
|---|---|---|---|---|---|---|---|---|---|
| 0001 | 0002 | 0101 | MAC100 | MAC20 | 10 | 0101 | 0110 | 192.168.1.101 | 0003 |
| 0002 | 0002 | 0102 | MAC102 | - | 30 | 0102 | - | 192.168.100.102 | - |
| 0003 | 0001 | 0001 | MAC1 | MAC10 | 10 | 0001 | 0010 | 192.168.1.1 | 0001 |
| 0004 | 0001 | 0002 | MAC2 | - | 10 | 0002 | - | 192.168.1.2 | - |
| 0005 | 0001 | 0002 | MAC3 | - | 20 | 0003 | - | 192.168.2.3 | - |

Fig. 16A

| ID 301 | CLOUD ID 302 | HYPERVISOR ID 303 | MAC ADDRESS 304 | TRANSLATED MAC ADDRESS 305 | VLAN ID 306 | VIRTUAL SW PORT ID 307 | ISOLATED VIRTUAL SW PORT ID 308 | IP ADDRESS 309 | RELATED ID 310 |
|---|---|---|---|---|---|---|---|---|---|
| 0001 | 0002 | 0101 | MAC100 | - | 10 | 0101 | - | 192.168.1.101 | - |
| 0002 | 0002 | 0102 | MAC102 | - | 30 | 0102 | - | 192.168.100.102 | - |
| 0003 | 0001 | 0001 | MAC1 | MAC10 | 10 | 0001 | 0010 | 192.168.1.1 | - |
| 0004 | 0001 | 0002 | MAC2 | - | 10 | 0002 | - | 192.168.1.2 | - |
| 0005 | 0001 | 0002 | MAC3 | - | 20 | 0003 | - | 192.168.2.3 | - |

Fig. 16B

COMMUNICATION CONTROL METHOD, COMPUTER SYSTEM, AND COMPUTER

CLAIM OF PRIORITY

The present application claims priority from Japanese patent application JP 2020-184055 filed on Nov. 4, 2020, the content of which is hereby incorporated by reference into this application.

BACKGROUND OF THE INVENTION

This invention relates to a technology for communication control of virtual machines operating on cloud infrastructures.

In recent years, there has been an increasing number of cases in which systems are built and operated by combining a plurality of cloud infrastructures. Examples of the combination include combinations of private clouds and public clouds of different types, and combinations of public clouds provided by different vendors.

Each cloud infrastructure forms an independent virtual network, and information on those virtual networks is not shared between the cloud infrastructures. Therefore, duplication of network information between the cloud infrastructures, specifically, MAC addresses set for the virtual machines, occurs, and this duplication causes communication failure. In particular, duplication of MAC addresses tends to occur when L2 between virtual environments on cloud infrastructure is extended.

The technologies described in JP 2013-9261 A, JP 2013-5038 A, and WO 2017/170155 A1 are known in relation to the problem described above.

In JP 2013-9261 A, it is described that "An assignment apparatus includes a collection module, a classification module, a determination module, and an assignment module. The collection module collects, when a network in which communication is performed by using MAC addresses is built between a plurality of bases by coupling communication paths built every two bases to each other via a switch in the bases, a communication path identifier for identifying the communication paths built every two bases for every switch. The classification module determines a coupling relationship between the communication paths based on the communication path identifiers, and classifies the terminals in each base into groups belonging to the same network. The determination module determines, for each classified group, whether or not there is duplication of the MAC addresses. The assignment module assigns an unused MAC address in a group to at least one of the plurality of terminals in which there is duplication of MAC addresses."

In JP 2013-5038 A, it is described that "A MAC address translation apparatus includes a MAC address translation module in a system for transferring frames transmitted from a terminal which is subordinate to a transmission source base to a terminal which is subordinate to a destination base. When the MAC address translation module receives a frame transferred from the transmission source base, a MAC address which is included in the frame and which uniquely identifies, in the transmission source base, the terminal subordinate to the transmission source base and the terminal subordinate to the destination base is translated to a MAC address which uniquely identifies, in the destination base, the terminal subordinate to the transmission source base and the terminal subordinate to the destination base."

In WO 2017/170155 A1, it is described that "A communication system according to an embodiment of the present invention includes: a flow processing apparatus that transmits a MAC duplication notification indicating an occurrence of MAC duplication in a case in which a plurality of frames received from different ports and belonging to a predetermined virtual network have the same sender MAC address; and a flow control apparatus that changes the configuration of the predetermined virtual network in a case in which the MAC duplication notification has been received from the flow processing apparatus."

SUMMARY OF THE INVENTION

There are cases in which it is difficult to change an already-assigned MAC address because a guest OS operating on a virtual machine holds the setting information relating to the MAC address. In that case, the technology described in JP 2013-9261 A is not adoptable. Further, it is also difficult to change the MAC address when the MAC address and middleware are associated with each other.

In the technology described in JP 2013-5038 A, the following problems occur when virtual machines are migrated between cloud infrastructures. When a virtual machine having a duplicated MAC addresses exists in a different cloud infrastructure and the virtual machine is migrated from one cloud infrastructure to another cloud infrastructure, the MAC address translation module does not function, resulting in a communication failure due to duplication of MAC addresses. Among virtual machines communicating in the same cloud infrastructure, when one of those virtual machines is migrated to a separate cloud infrastructure, the MAC address of the migrated virtual machine is translated by the MAC address translation module. Therefore, during the period until address resolution is complete, communication between the migrated virtual machine and the virtual machine of the migration source cloud infrastructure is temporarily disconnected.

In the technology described in WO 2017/170155 A1, the configuration of the virtual network is changed, and therefore the scale of the change is large and the time required for the change is long. Further, there are cases in which the configuration of the virtual network is not desired, or the configuration of the virtual network is not changeable due to the nature of the cloud infrastructure.

This invention is to provide a technology for solving the problems of the related art, and for avoiding communication failure due to duplication of MAC addresses.

A representative example of the present invention disclosed in this specification is as follows: A computer system comprises a plurality of cloud infrastructures. Each of the plurality of cloud infrastructures includes a plurality of computers. Each of the plurality of computers includes a hypervisor configured to manage a virtual machine created by using a resource of the each of the plurality of computers. The virtual machine has a MAC address assigned thereto. The hypervisor includes a duplication correction virtual machine operating thereon. The duplication correction virtual machine is configured to control communication of a duplication virtual machine to which the same MAC address as the MAC address assigned to another virtual machine is assigned. Each of the plurality of cloud infrastructures includes a MAC address duplication monitoring module configured to monitor duplication of the MAC address of each of the virtual machines of the each of the plurality of cloud infrastructure and of another cloud infrastructure. A communication control method includes: a first step of generating, by the MAC address duplication monitoring module, a translated MAC address in a case of detecting duplication of the MAC address; a second step of transmitting, by the MAC address duplication monitoring module, a duplication correction request including the translated MAC address to one of the plurality of computers on which the duplication virtual machine operates; a third step of generating, by the duplication correction virtual machine, translation information in which the MAC address assigned to the duplication virtual machine and the translated MAC address are associated with each other in a case of receiving the duplication correction request; and a fourth step of controlling, by the duplication correction virtual machine, communication between the duplication virtual machine and another virtual machine by using the translation information.

According to at least one embodiment of this invention, it is possible to solve the problems of the related art, and avoid the communication failure due to the duplication of MAC addresses. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 1 is a diagram for illustrating a configuration example of a computer system according to a first embodiment of this invention;

FIG. 3A and FIG. 3B are tables for showing an example of data structure of network configuration information in the first embodiment;

FIG. 10A, FIG. 10B, and FIG. 10C are tables for showing an example of data structure of the network configuration information in the first embodiment;

FIG. 11 is a table for showing an example of data structure of the MAC address translation information in the first embodiment;

FIG. 12A, FIG. 12B, and FIG. 12C are tables for showing an example of data structure of the network configuration information in the first embodiment;

FIG. 13 is a table for showing an example of data structure of the MAC address translation information in the first embodiment;

FIG. 15A, FIG. 15B, and FIG. 15C are tables for showing an example of data structure of the network configuration information in the first embodiment;

FIG. 16A, FIG. 16B, and FIG. 16C are tables for showing an example of data structure of the network configuration information in the first embodiment.

DETAILED DESCRIPTION OF THE PREFERRED EMBODIMENTS

Figure 2A:
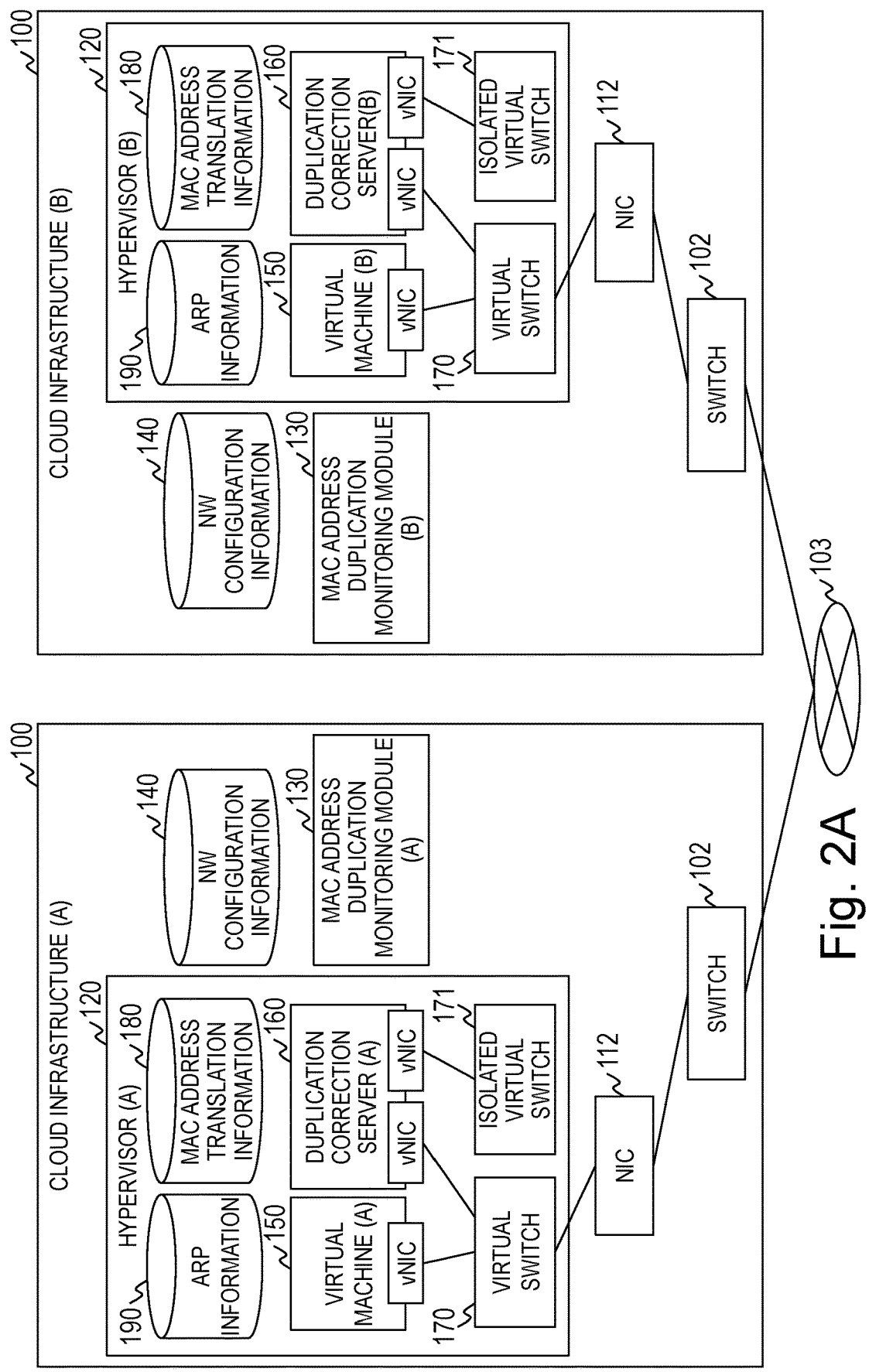
FIG. 2A and FIG. 2B are diagrams for illustrating an outline of operation of the computer system of the first embodiment.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

First Embodiment

FIG. 1 is a diagram for illustrating a configuration example of a computer system according to a first embodiment of this invention.

The computer system includes a plurality of cloud infrastructures 100. Each cloud infrastructure 100 is communicably coupled to the other cloud infrastructures via a network 103. The network 103 is, for example, a local area network (LAN) or the Internet. The method of coupling to the network 103 may be any one of a wired manner and a wireless manner.

It is assumed that the computer system includes cloud infrastructures 100 having different characteristics. As used herein, "characteristics" means, for example, a difference in type, for example a public cloud or a private cloud, or a difference in providing vendor.

Each cloud infrastructure 100 includes a plurality of computers 101 and a plurality of switches 102. Each cloud infrastructure 100 may include other components, for example, a storage system.

Each computer 101 includes a processor 110, a memory 111, and a network interface card (NIC) as computer resources. Each computer 101 may include a storage medium, for example, a hard disk drive (HDD) and a solid state drive (SSD).

The processor 110 executes programs stored in the memory 111. Through execution of processing in accordance with a program, the processor 110 operates as a module for implementing a specific function. In the following description, when processing is described with the module as the subject of the sentence, this means that the processor 110 is executing the program for implementing the module.

The memory 111 stores the programs to be executed by the processor 110 and information to be used by the programs. The memory 111 is also used as a work area.

An NIC 112 is an interface for communicating via a network.

The switch 102 is a network apparatus for coupling the cloud infrastructures 100.

A program for implementing a hypervisor 120 for controlling a virtual machine 150 is stored in the memory 111 of at least one computer 101. Further, the memory 111 stores information being actual data on the virtual machine 150 and a duplication correction server 160, information being actual data on a virtual switch 170 and an isolated virtual switch 171, programs, for example, an operating system (OS) operating on the virtual machine 150, and various types of information.

The hypervisor 120 uses a computer resource to create a virtual machine 150 having one virtual NIC (vNIC), and also to create a virtual switch 170 forming a virtual network. The hypervisor 120 in the first embodiment uses a computer resource to create a duplication correction server 160 having two vNICs, and to create an isolated virtual switch 171 to be used to avoid duplication of MAC addresses. A virtual MAC address is assigned to each vNIC.

The virtual machine 150 executes processing for implementing a predetermined service. The virtual machine 150 manages address resolution protocol (ARP) information 190 for communicating to and from virtual machines 150 belonging to the same virtual network (same segment). The data structure of the ARP information 190 is described with reference to FIG. 5A and FIG. 5B.

The duplication correction server 160 controls communication of a virtual machine 150 to which a duplicated MAC address is assigned. The duplication correction server 160 manages MAC address translation information 180. The data structure of the MAC address translation information 180 is described with reference to FIG. 4.

A program for implementing a MAC address duplication monitoring module 130 is stored in the memory 111 of at least one computer 101.

The MAC address duplication monitoring module 130 monitors duplication of MAC addresses in the virtual network. The MAC address duplication monitoring module 130 monitors duplication of MAC addresses in units of virtual networks (segments). The MAC address duplication monitoring module 130 manages network configuration information 140 storing the MAC address of each cloud infrastructure 100. The data structure of the network configuration information 140 is described with reference to FIG. 3A and FIG. 3B.

The MAC address duplication monitoring module 130 may be implemented by using a virtual machine. Further, the hypervisor 120 may have the function of the MAC address duplication monitoring module 130.

Figure 2B:
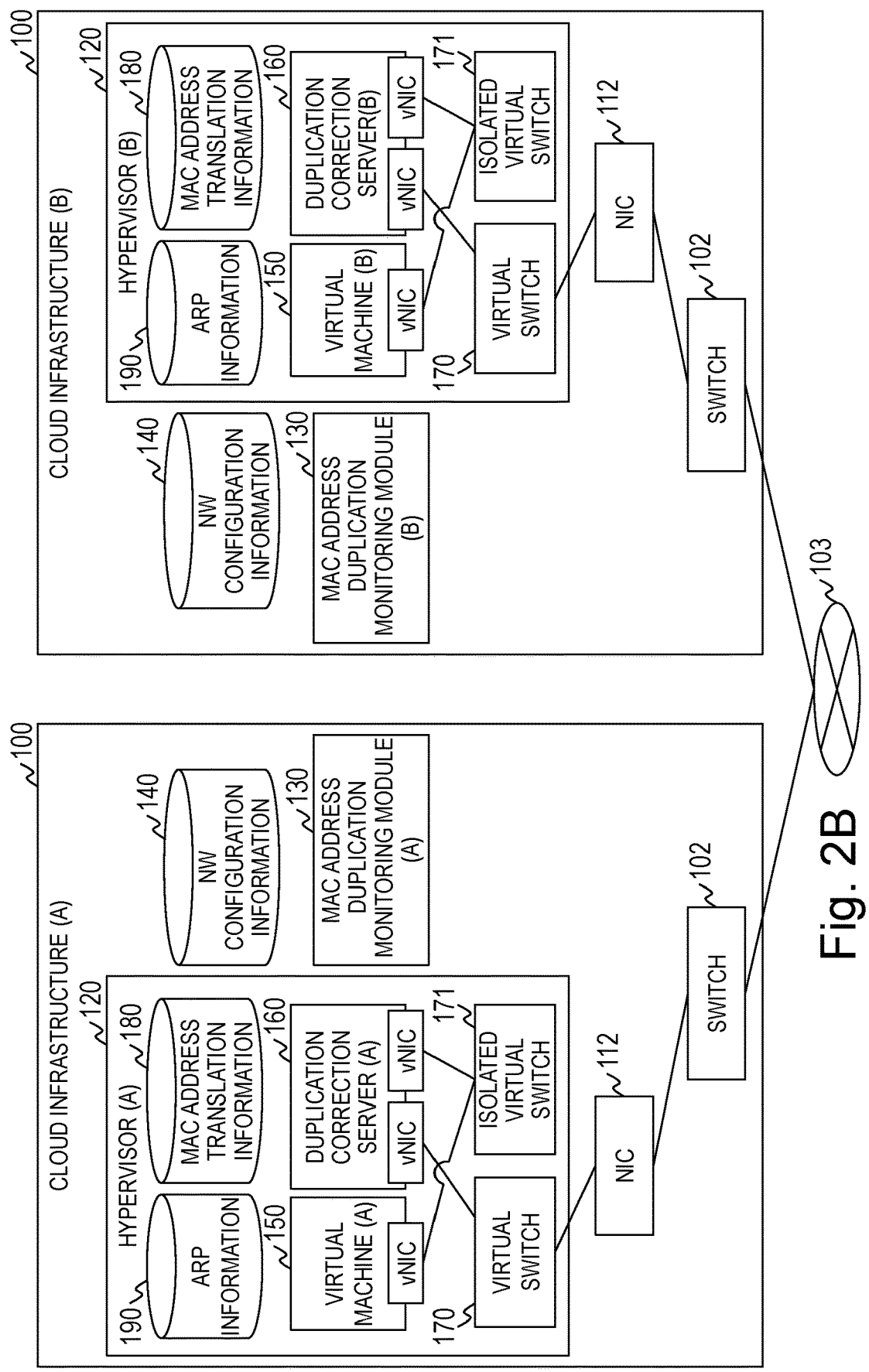

FIG. 2A and FIG. 2B are diagrams for illustrating an outline of operation of the computer system of the first embodiment.

The hypervisor 120 performs setting so that, in a case where a virtual machine 150 is created, the virtual machine 150 is coupled to a virtual switch 170. The virtual machine 150 communicates to and from virtual machines 150 of the own cloud infrastructure 100 or of another cloud infrastructure 100 via the vNIC, the virtual switch 170, the NIC 112, and the switch 102. As used herein, the own cloud infrastructure 100 is a cloud infrastructure 100 including a computer 101 on which the virtual machine 150 operates, and the another cloud infrastructure 100 is a cloud infrastructure 100 other than the own cloud infrastructure 100.

The hypervisor 120 performs setting so that, in a case where a duplication correction server 160 is created, one vNIC of the duplication correction server 160 couples to a virtual switch 170 and another vNIC couples to an isolated virtual switch 171.

In a case where duplication of MAC addresses is detected, the following processing is executed. Here, it is assumed that the MAC address of a virtual machine (A) 150 of a cloud infrastructure (A) 100 and the MAC address of a virtual machine (B) 150 of a cloud infrastructure (B) 100 are duplicated. Further, the processing on the cloud infrastructure (A) 100 side is described below, but the same processing is executed on the cloud infrastructure (B) side as well.

(Processing 1) A MAC address duplication monitoring module (A) 130 obtains information on the MAC address of the own cloud infrastructure (A) 100, and stores the obtained information in the network configuration information 140. Further, the MAC address duplication monitoring module (A) 130 synchronizes the network configuration information 140 between the cloud infrastructures 100 by communicating to and from a MAC address duplication monitoring module (B) 130 of the cloud infrastructure (B) 100.

(Processing 2) In a case where the MAC address duplication monitoring module (A) 130 detects duplication of the MAC address assigned to the virtual machine (A) 150, the MAC address duplication monitoring module (A) 130 transmits a duplication correction request including a translated MAC address to a duplication correction server (A) 160. As used herein, a virtual machine 150 having a duplicated MAC address is referred to as "duplication virtual machine 150."

(Processing 3) In a case where the duplication correction server (A) 160 receives the duplication correction request, the duplication correction server (A) 160 instructs the hypervisor 120 to switch the coupling destination of the vNIC of the duplication virtual machine (A) 150 from the virtual switch 170 to the isolated virtual switch 171. As a result, the coupling state transitions from the state of FIG. 2A to the state of FIG. 2B.

(Processing 4) The duplication correction server (A) 160 transmits, into the virtual network, a gratuitous address resolution protocol (GARP) prompting updating to the translated MAC address.

(Processing 5) In a case where the duplication correction server (A) 160 receives a packet from the duplication virtual machine (A) 150 via the isolated virtual switch 171, the duplication correction server (A) 160 translates the MAC address to the translated MAC address, and transmits the packet via the virtual switch 170, the NIC 112, and the switch 102. In a case where the duplication correction server (A) 160 receives a packet addressed to the duplication virtual machine (A) 150 via the virtual switch 170, the duplication correction server (A) 160 translates the translated MAC address to the MAC address, and transmits the packet to the duplication virtual machine (A) 150 via the isolated virtual switch 171.

In a case where the duplication of the MAC address is resolved, processing like the following is executed.

(Processing 6) In a case where the MAC address duplication monitoring module 130 detects that the duplication of the MAC address assigned to the duplication virtual machine (A) 150 has been resolved, the MAC address duplication monitoring module 130 transmits a release request to the duplication correction server (A) 160.

(Processing 7) In a case where the duplication correction server (A) 160 receives the release request, the duplication correction server (A) 160 instructs the hypervisor 120 to switch the coupling destination of the vNIC of the duplication virtual machine (A) 150 from the isolated virtual switch 171 to the virtual switch 170. As a result, the coupling state transitions from the state of FIG. 2B to the state of FIG. 2A. In this case, the packets transmitted from the duplication virtual machine (A) 150 and the packets addressed to the duplication virtual machine (A) 150 are transmitted via the virtual switch 170 without passing through the duplication correction server (A) 160.

(Processing 8) The duplication correction server (A) 160 transmits, into the virtual network, a GARP prompting updating to the MAC address.

Figure 3A:
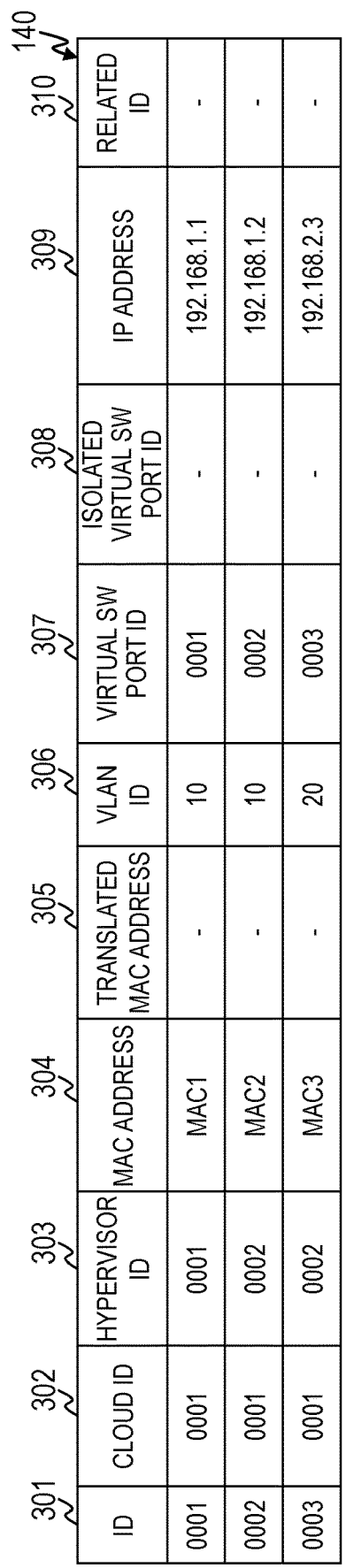

FIG. 3A and FIG. 3B are tables for showing an example of data structure of the network configuration information 140 in the first embodiment. In FIG. 3A, there is shown the network configuration information 140 on the cloud infrastructure (A) 100 side, and in FIG. 3B, there is shown the network configuration information 140 on the cloud infrastructure (B) 100 side.

The network configuration information 140 stores records, each of which includes an ID 301, a cloud ID 302, a hypervisor ID 303, a MAC address 304, a translated MAC address 305, a VLAN ID 306, a virtual switch port ID 307, an isolated virtual switch port ID 308, an IP address 309, and a related ID 310. One record corresponds to one virtual machine 150.

The ID 301 is a field for storing information, for example, numerical values and symbols, for identifying the record. The cloud ID 302 is a field for storing information, for example, numerical values and symbols, for identifying the cloud infrastructure 100. The hypervisor ID 303 is a field for storing information, for example, numerical values and symbols, for identifying the hypervisor 120.

The MAC address 304 is a field for storing the MAC address assigned to the virtual machine 150 on the hypervisor 120. The translated MAC address 305 is a field for storing the translated MAC address assigned to the duplication virtual machine 150. The VLAN ID 306 is a field for storing information for identifying the VLAN.

The virtual switch port ID 307 is a field for storing information for identifying the port of the virtual switch 170 to which the virtual machine 150 is coupled. The isolated virtual switch port ID 308 is a field for storing information for identifying the port of the isolated virtual switch 171 to which the duplication virtual machine 150 is coupled.

The IP address 309 is a field for storing the IP address assigned to the virtual machine 150 on the hypervisor 120.

The related ID 310 is a field for storing information for identifying the record in which the duplicated MAC address is set.

The structure of the record stored in the network configuration information 140 is an example, and the structure is not limited to this.

Figure 4:
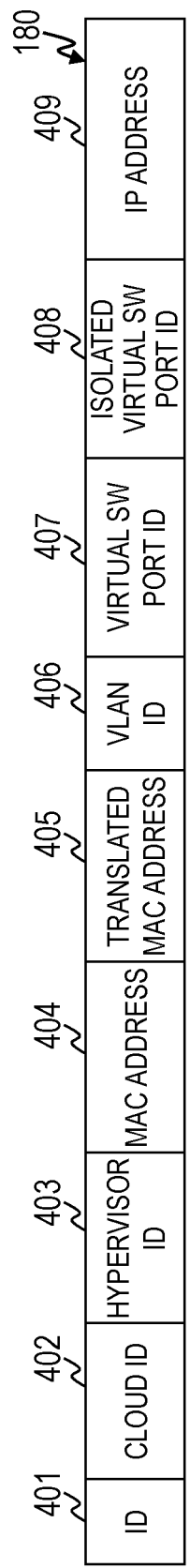
FIG. 4 is a table for showing an example of data structure of MAC address translation information in the first embodiment.

FIG. 4 is a table for showing an example of data structure of the MAC address translation information 180 in the first embodiment.

The MAC address translation information 180 stores records, each of which includes an ID 401, a cloud ID 402, a hypervisor ID 403, a MAC address 404, a translated MAC address 405, a VLAN ID 406, a virtual switch port ID 407, an isolated virtual switch port ID 408, and an IP address 409. One record corresponds to one duplication virtual machine 150.

Each field of the records of the MAC address translation information 180 is the same as the corresponding field of the records of the network configuration information 140.

The structure of the records stored in the MAC address translation information 180 is an example, and the structure is not limited to this.

Figure 5A:
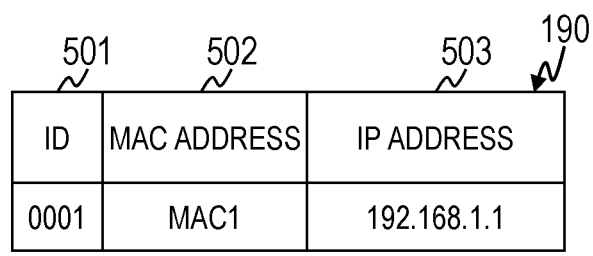
FIG. 5A and FIG. 5B are tables for showing an example of data structure of ARP information in the first embodiment.
Figure 5B:
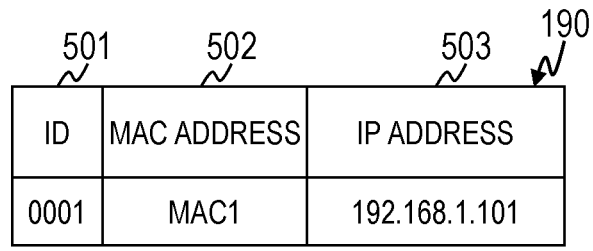

FIG. 5A and FIG. 5B are tables for showing an example of data structure of the ARP information 190 in the first embodiment. In FIG. 5A, there is shown the ARP information 190 managed by the virtual machine (A) 150, and in FIG. 5B, there is shown the ARP information 190 managed by the virtual machine (B) 150.

The ARP information 190 stores records, each of which includes an ID 501, a MAC address 502, and an IP address 503. There is one record for each virtual machine 150 in the virtual network.

The ID 501 is a field for storing information, for example, numerical values and symbols, for identifying the record. The MAC address 502 is a field for storing the MAC address assigned to the virtual machine 150. The IP address 503 is a field for storing the IP address assigned to the virtual machine 150.

Next, details of processing of the computer system are described with reference to FIG. 6 to FIG. 9.

Figure 6:
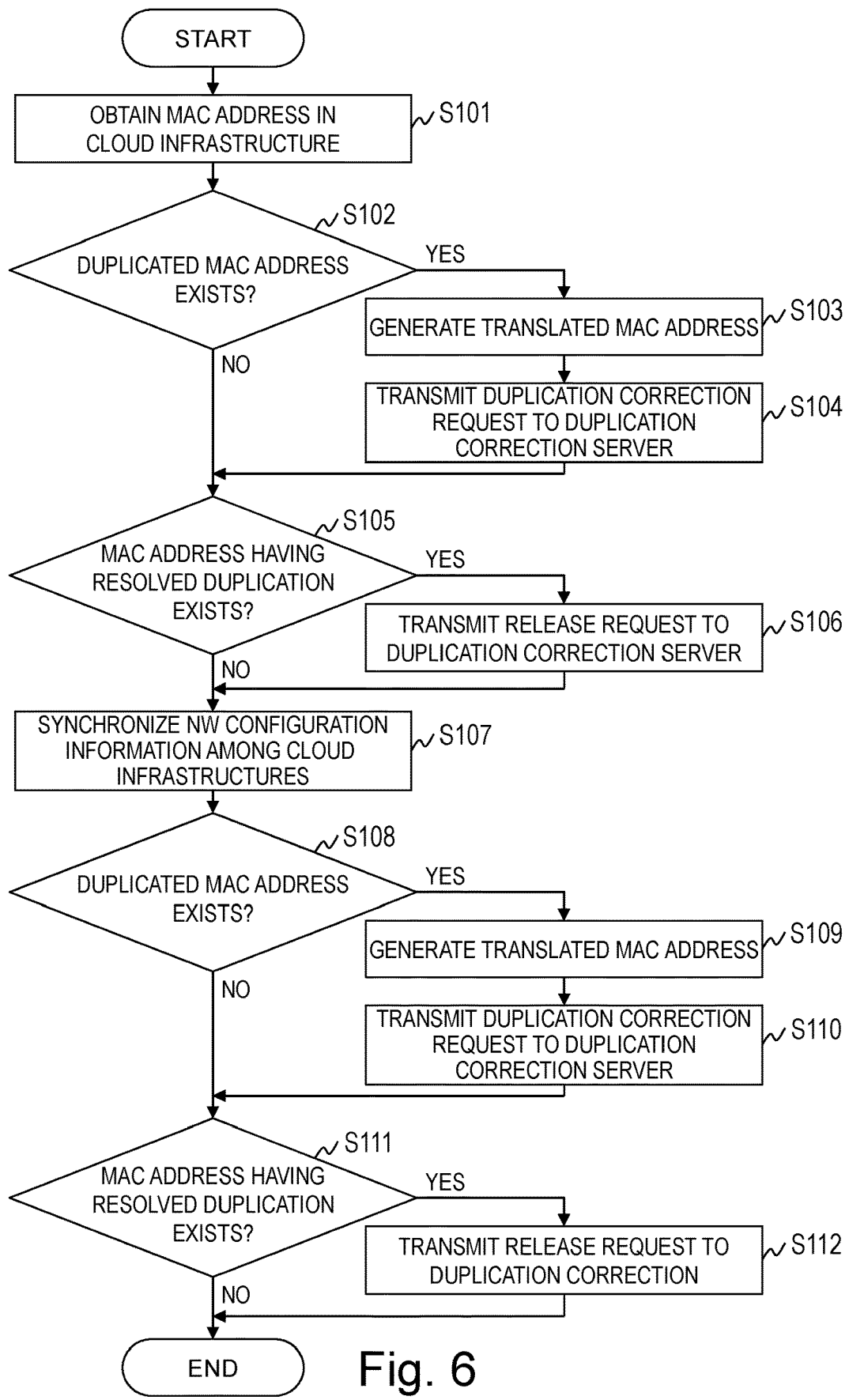
FIG. 6 is a flowchart for illustrating an example of processing to be executed by a MAC address duplication monitoring module in the first embodiment.

FIG. 6 is a flowchart for illustrating an example of processing to be executed by the MAC address duplication monitoring module 130 in the first embodiment.

The MAC address duplication monitoring module 130 executes the processing described below periodically or in a case of detecting an event. The event is, for example, reception of an execution request from a user and execution of migration of a virtual machine 150.

The MAC address duplication monitoring module 130 obtains the information on the MAC address assigned to a virtual machine 150 from each hypervisor 120 of the own cloud infrastructure 100 (Step S101), and updates the network configuration information 140 based on the obtained information.

Specifically, the MAC address duplication monitoring module 130 sets, in a case where a record of a virtual machine 150 exists, a MAC address in the MAC address 304 of the record of the virtual machine 150. In a case where a record of a virtual machine 150 does not exist, the MAC address duplication monitoring module 130 adds a record, and sets a value in each of the ID 301, the cloud ID 302, the hypervisor ID 303, the MAC address 304, the VLAN ID 306, the virtual switch port ID 307, and the IP address 309 of the added record.

Next, the MAC address duplication monitoring module 130 refers to the network configuration information 140, and determines whether or not a duplicated MAC address exists (Step S102). Specifically, processing like the following is executed.

(Step S102-1) The MAC address duplication monitoring module 130 retrieves records in which the identification information on the own cloud infrastructure 100 is set in the cloud ID 302.

(Step S102-2) The MAC address duplication monitoring module 130 selects one target record from the retrieved records.

(Step S102-3) The MAC address duplication monitoring module 130 refers to the MAC address 304 and the VLAN ID 306 of the target record and of the other records, and determines whether or not a duplicated MAC address exists.

In a case where there are one or more records in which the combination of the values of the MAC address 304 and the VLAN ID 306 matches the combination of the values of the MAC address 304 and the VLAN ID 306 of the target record, the MAC address duplication monitoring module 130 determines that a duplicated MAC address exists.

(Step S102-4) The MAC address duplication monitoring module 130 determines whether or not the processing of all the records retrieved in Step S102-1 is complete. In a case where the processing of all the records is not complete, the process returns to Step S102-2, and the MAC address duplication monitoring module 130 executes the same processing. In a case where the processing of all the records is complete, the MAC address duplication monitoring module 130 ends the processing of Step S102.

Records in which a translated MAC address is set in the translated MAC address 305 are excluded from the determination.

The processing of Step S102 has been described above.

In a case where a duplicated MAC address does not exist, the MAC address duplication monitoring module 130 advances the process to Step S105.

In a case where a duplicated MAC address exists, the MAC address duplication monitoring module 130 generates a translated MAC address to be assigned to the duplication virtual machine 150 (Step S103). Specifically, processing like the following is executed.

(Step S103-1) The MAC address duplication monitoring module 130 randomly generates a translated MAC address. The MAC address duplication monitoring module 130 refers to the MAC address 304 and the translated MAC address 305 of each record of the network configuration information 140, and in a case where the same MAC address as the generated translated MAC address exists, the translated MAC address is generated again.

(Step S103-2) The MAC address duplication monitoring module 130 sets information identifying another record having the same MAC address set in the related ID 310 of each record.

The processing of Step S103 has been described above.

Next, the MAC address duplication monitoring module 130 transmits a duplication correction request including the record in which the translated MAC address is set to the duplication correction server 160 on the hypervisor 120 on which the duplication virtual machine 150 operates (Step S104). Then, the MAC address duplication monitoring module 130 advances the process to Step S105.

In a case where the MAC address duplication monitoring module 130 receives a notification of a port number of the isolated virtual switch 171 from the duplication correction server 160, the MAC address duplication monitoring module 130 sets a value in the isolated virtual switch port ID 308 of the corresponding record.

In Step S105, the MAC address duplication monitoring module 130 refers to the network configuration information 140, and determines whether or not a MAC address having a resolved duplication exists (Step S105). Specifically, processing like the following is executed.

(Step S105-1) The MAC address duplication monitoring module 130 retrieves records in which the identification information on the own cloud infrastructure 100 is set in the cloud ID 302 and in which a value is set in the related ID 310.

(Step S105-2) The MAC address duplication monitoring module 130 selects a target record from among the retrieved records.

(Step S105-3) The MAC address duplication monitoring module 130 determines whether or not the value of the MAC address 304 of the target record matches the value of the MAC address 304 of a record having the related ID 310 of the target record. In a case where the values of the MAC addresses 304 of the two records do not match, the MAC address duplication monitoring module 130 determines that a MAC address having a resolved duplication exists.

The MAC address duplication monitoring module 130 determines whether or not the processing of all the records retrieved in Step S105-1 is complete. In a case where the processing of all the records is not complete, the MAC address duplication monitoring module 130 returns to Step S105-2, and executes the same processing. In a case where the processing of all the records is complete, the MAC address duplication monitoring module 130 ends the processing of Step S105.

The processing of Step S105 has been described above.

In a case where a MAC address having a resolved duplication does not exist, the MAC address duplication monitoring module 130 advances the process to Step S107.

In a case where a MAC address having a resolved duplication exists, the MAC address duplication monitoring module 130 transmits, to the duplication correction server 160 on the hypervisor 120 on which the duplication virtual machine 150 operates, a release request including the record in which the MAC address for which duplication has been resolved is set (Step S106). Then, the MAC address duplication monitoring module 130 advances the process to Step S107.

At this time, the MAC address duplication monitoring module 130 deletes the values of the translated MAC address 305, the isolated virtual switch port ID 308, and the related ID 310 of the record of the duplication virtual machine 150 of the own cloud infrastructure 100. Further, the MAC address duplication monitoring module 130 deletes the value of the related ID 310 of the record of the duplication virtual machine 150 of the another cloud infrastructure 100.

In Step S107, the MAC address duplication monitoring module 130 synchronizes the network configuration information 140 with the MAC address duplication monitoring modules 130 of the other cloud infrastructures 100 (Step S107).

Next, the MAC address duplication monitoring module 130 refers to the network configuration information 140, and determines whether or not a duplicated MAC address exists (Step S108). The processing of Step S108 is the same processing as the processing of Step S102.

In a case where a duplicated MAC address does not exist, the MAC address duplication monitoring module 130 advances the process to Step S111.

In a case where a duplicated MAC address exists, the MAC address duplication monitoring module 130 generates a translated MAC address to be assigned to the duplication virtual machine 150 (Step S109). The processing of Step S109 is the same processing as the processing of Step S103.

Next, the MAC address duplication monitoring module 130 transmits a duplication correction request including the information identifying the duplication virtual machine 150 and the translated MAC address to the duplication correction server 160 on the hypervisor 120 on which the duplication virtual machine 150 operates (Step S110). Then, the MAC address duplication monitoring module 130 advances the process to Step S111. The processing of Step S110 is the same processing as the processing of Step S104.

In Step S111, the MAC address duplication monitoring module 130 refers to the network configuration information 140, and determines whether or not a MAC address having a resolved duplication exists (Step S111). The processing of Step S111 is the same processing as the processing of Step S105.

In a case where a MAC address having a resolved duplication does not exist, the MAC address duplication monitoring module 130 ends the processing.

In a case where a MAC address having a resolved duplication exists, the MAC address duplication monitoring module 130 transmits, to the duplication correction server 160 on the hypervisor 120 on which the duplication virtual machine 150 operates, a release request including the information identifying the duplication virtual machine 150 (Step S112). Then, the MAC address duplication monitoring module 130 ends the processing. The processing of Step S112 is the same processing as the processing of Step S106.

During migration of the duplication virtual machine 150, the record having the MAC address translation information 180 is deleted. The same processing is performed by the MAC address duplication monitoring module 130 of the migration destination of the duplication virtual machine 150. As a result, a communication failure due to duplication of MAC addresses can be avoided after the migration as well.

Figure 7:
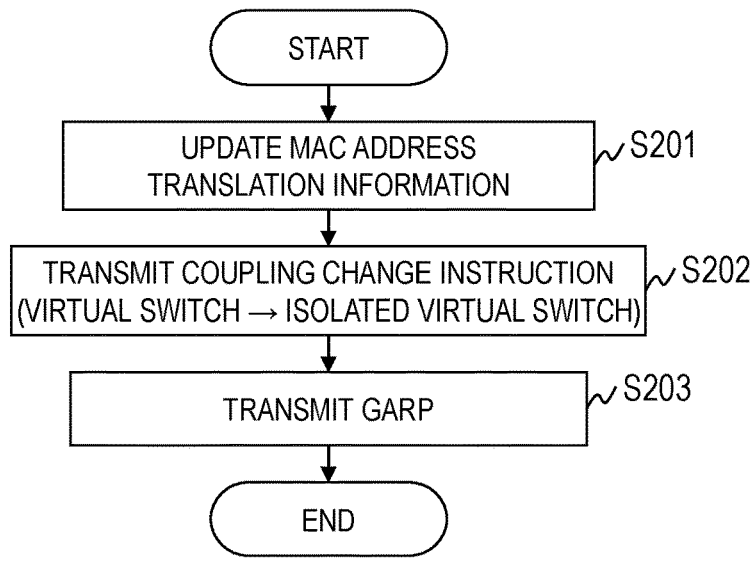
FIG. 7 is a flowchart for illustrating an example of processing to be executed by a duplication correction server in the first embodiment.

FIG. 7 is a flowchart for illustrating an example of processing to be executed by the duplication correction server 160 in the first embodiment.

In a case where the duplication correction server 160 receives the duplication correction request, the duplication correction server 160 executes the processing described below.

The duplication correction server 160 updates the MAC address translation information 180 based on the record included in the duplication correction request (Step S201).

Specifically, the duplication correction server 160 adds a record to the MAC address translation information 180, and sets the identification information in the ID 401 of the record. Further, the duplication correction server 160 copies the value of each field of the record included in the duplication correction request to the corresponding field of the added record.

Next, the duplication correction server 160 transmits a coupling change instruction to the hypervisor 120 (Step S202). The coupling change instruction includes the MAC address as information for specifying the duplication virtual machine 150. The MAC address is the MAC address assigned by the hypervisor 120.

In a case where the hypervisor 120 receives the coupling change instruction, the hypervisor 120 switches the coupling destination of the vNIC of the duplication virtual machine 150 from the virtual switch 170 to the isolated virtual switch 171. The hypervisor 120 notifies, as a processing result, the duplication virtual machine 150 of the port number of the isolated virtual switch 171. The duplication correction server 160 notifies the MAC address duplication monitoring module 130 of the port number of the isolated virtual switch 171 included in the notification.

Next, the duplication correction server 160 transmits a gratuitous ARP (GARP) in which the translated MAC address is set to the virtual machines 150 belonging to the virtual network to which the duplication virtual machine 150 is coupled (Step S203). Then, the duplication correction server 160 ends the processing. The virtual machine 150 that has received the GARP updates the ARP information 190.

The MAC address duplication monitoring module 130 may transmit a coupling change instruction together with the duplication correction request. In this case, the processing of Step S202 can be omitted. The hypervisor 120 notifies the MAC address duplication monitoring module 130 of the port number of the isolated virtual switch 171.

Figure 8:
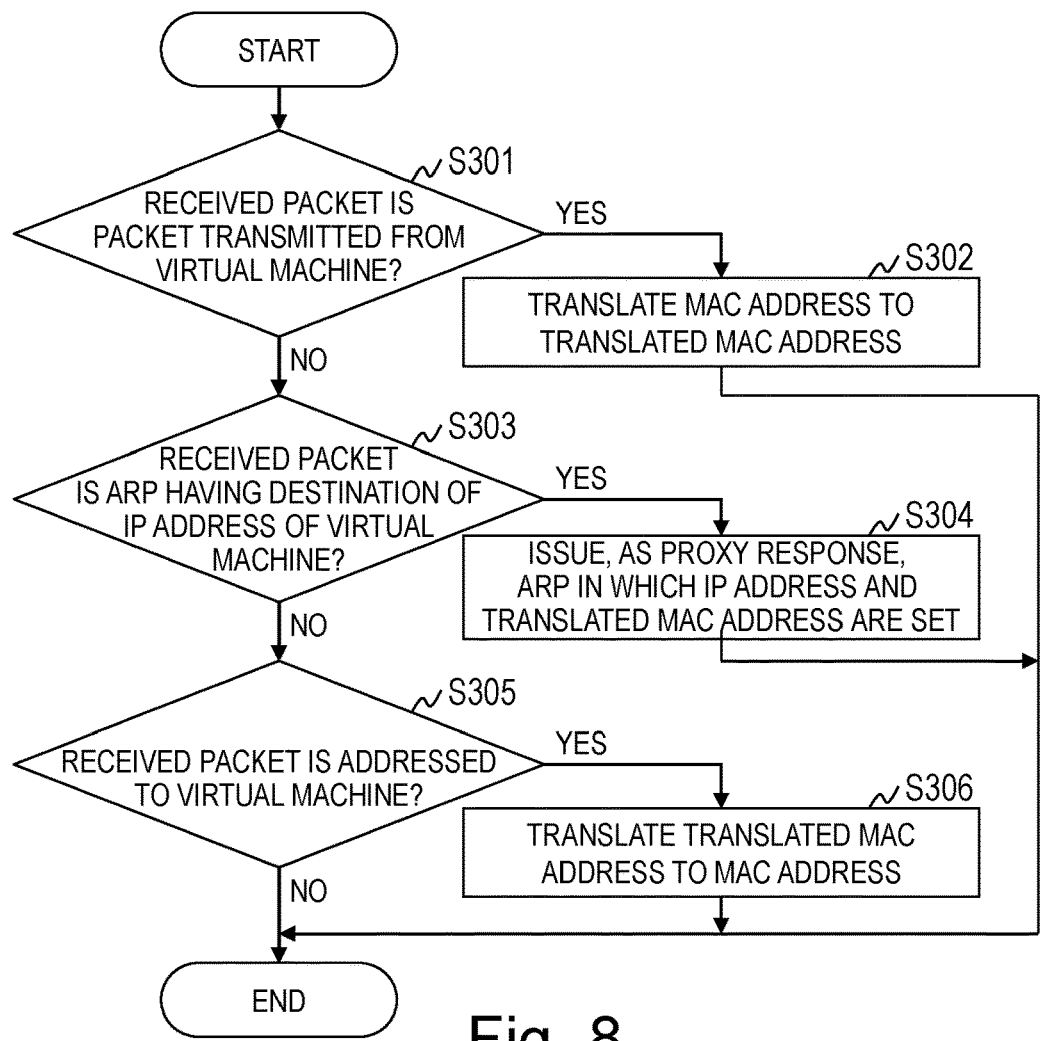
FIG. 8 is a flowchart for illustrating an example of processing to be executed by the duplication correction server in the first embodiment.

FIG. 8 is a flowchart for illustrating an example of processing to be executed by the duplication correction server 160 in the first embodiment.

In a case where the duplication correction server 160 receives a packet from the isolated virtual switch 171, the duplication correction server 160 executes the processing described below.

The duplication correction server 160 determines whether or not the received packet is a packet transmitted from the virtual machine 150 (Step S301).

In a case where the received packet is a packet transmitted from the virtual machine 150, the duplication correction server 160 translates the MAC address included in the packet to a translated MAC address based on the MAC address translation information 180 (Step S302), and transmits the packet to the outside via the virtual switch 170. Then, the duplication correction server 160 ends the processing.

Specifically, the duplication correction server 160 retrieves records in which the MAC address included in the packet is set in the MAC address 404, and obtains the translated MAC address set in the translated MAC address 405 of the retrieved records. The duplication correction server 160 translates the MAC address included in the packet to the obtained translated MAC address.

In a case where the received packet is not a packet transmitted from the virtual machine 150, the duplication correction server 160 determines whether or not the received packet is an ARP having a destination of the IP address of the virtual machine 150 (Step S303).

In a case where the received packet is an ARP having a destination of the IP address of the virtual machine 150, the duplication correction server 160 issues, as a proxy response, an ARP in which the IP address and the translated MAC address are set (Step S304). Then, the duplication correction server 160 ends the processing.

In a case where the received packet is not an ARP having a destination of the IP address of the virtual machine 150, the duplication correction server 160 determines whether or not the received packet is a packet addressed to the virtual machine 150 (Step S305).

In a case where the received packet is not a packet addressed to the virtual machine 150, the duplication correction server 160 ends the processing.

In a case where the received packet is a packet addressed to the virtual machine 150, the duplication correction server 160 translates the translated MAC address of the received packet to a MAC address (Step S306), and transmits the packet to the virtual machine 150 via the isolated virtual switch 171. Then, the duplication correction server 160 ends the processing.

Specifically, the duplication correction server 160 retrieves records in which the translated MAC address included in the packet is set in the translated MAC address 405, and obtains the MAC address set in the MAC address 404 of the retrieved records. The duplication correction server 160 translates the translated MAC address included in the packet to the obtained MAC address.

Figure 9:
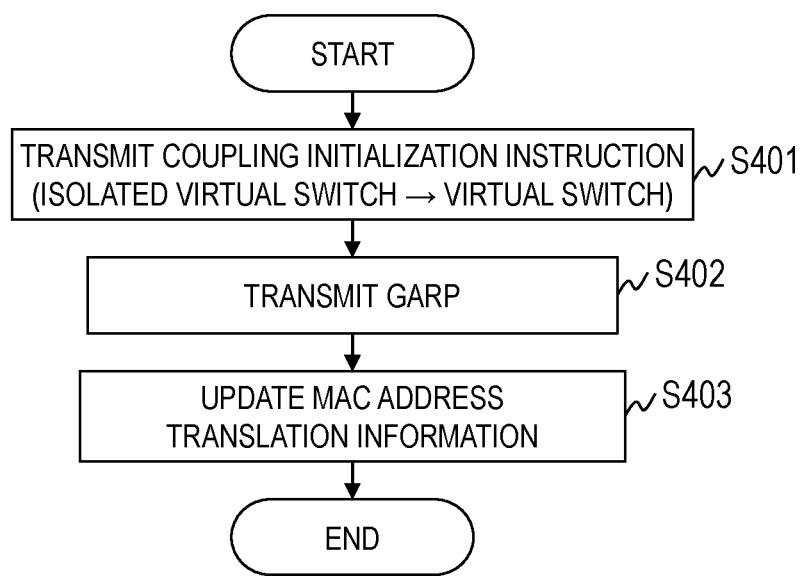
FIG. 9 is a flowchart for illustrating an example of processing to be executed by the duplication correction server in the first embodiment.

FIG. 9 is a flowchart for illustrating an example of processing to be executed by the duplication correction server 160 in the first embodiment.

In a case where the duplication correction server 160 receives the release request, the duplication correction server 160 executes the processing described below.

The duplication correction server 160 transmits a coupling initialization instruction to the hypervisor 120 (Step S401). The coupling initialization instruction includes the MAC address as information for specifying the duplication virtual machine 150. The MAC address is the MAC address assigned by the hypervisor 120.

In a case where the hypervisor 120 receives a coupling initialization instruction, the hypervisor 120 switches the coupling destination of the vNIC of the duplication virtual machine 150 from the isolated virtual switch 171 to the virtual switch 170.

Next, the duplication correction server 160 transmits a GARP in which the MAC address is set to the virtual machines 150 belonging to the virtual network to which the duplication virtual machine 150 is coupled (Step S402). Then, the duplication correction server 160 ends the processing. The virtual machine 150 that has received the GARP updates the ARP information 190.

The duplication correction server 160 updates the MAC address translation information 180 based on the record included in the release request (Step S403). Then, the duplication correction server 160 ends the processing.

Specifically, the duplication correction server 160 refers to the MAC address translation information 180, and retrieves records in which the value of the MAC address 404 matches the value of the MAC address 304 of the record included in the release request. The duplication correction server 160 deletes the retrieved records.

The MAC address duplication monitoring module 130 may transmit a coupling initialization instruction together with the release request. In this case, the processing of Step S401 can be omitted.

Next, specific data processing is described. First, data processing to be executed in a case where duplication of the MAC addresses occurs is described.

It is assumed that the MAC address translation information 180 on the cloud infrastructure (A) 100 and the cloud infrastructure (B) 100 is in the state shown in FIG. 4, the virtual machine (A) 150 holds the ARP information 190 shown in FIG. 5A, and the virtual machine (B) 150 holds the ARP information 190 shown in FIG. 5B. At this point, the ARP information 190 is undefined because the MAC addresses are duplicated.

The data processing on the cloud infrastructure (A) 100 side is described. The MAC address duplication monitoring module (A) 130 obtains the MAC address information from the cloud infrastructure (A) 100, and as a result, the MAC address duplication monitoring module (A) 130 holds the network configuration information 140 shown in FIG. 3A. In this case, the determination results of Step S102 and Step S105 are both "NO".

The MAC address duplication monitoring module (A) 130 synchronizes the network configuration information 140 with the MAC address duplication monitoring module (B) 130 of the cloud infrastructure (B) 100, and as a result, holds the network configuration information 140 shown in FIG. 10A. In this case, the records having the ID 301 of "0001" and the ID 301 of "0004" have the same values as the VLAN ID 306, and "MAC 1" is duplicated, and therefore the determination result in Step S108 is "YES".

In Step S109, the MAC address duplication monitoring module (A) 130 generates "MAC 10" as a translated MAC address. The MAC address duplication monitoring module (A) 130 sets "MAC 10" in the translated MAC address 305 of the record corresponding to the duplication virtual machine (A) 150 of the own cloud infrastructure (A) 100, that is, the record having the ID 301 of "0001". Further, the MAC address duplication monitoring module (A) 130 sets "0004" in the related ID 310 of the record, and sets "0001" in the related ID 310 of the record having the ID 301 of "0004".

In Step S110, the MAC address duplication monitoring module (A) 130 transmits a duplication correction request to the duplication correction server (A) 160. In a case where the MAC address duplication monitoring module (A) 130 receives notification of the port number "0010" of the isolated virtual switch 171 from the duplication correction server (A) 160, the MAC address duplication monitoring module (A) 130 sets "0010" in the isolated virtual switch port ID 308 of the record corresponding to the duplication virtual machine (A) 150 of the own cloud infrastructure (A) 100.

Figure 10B:
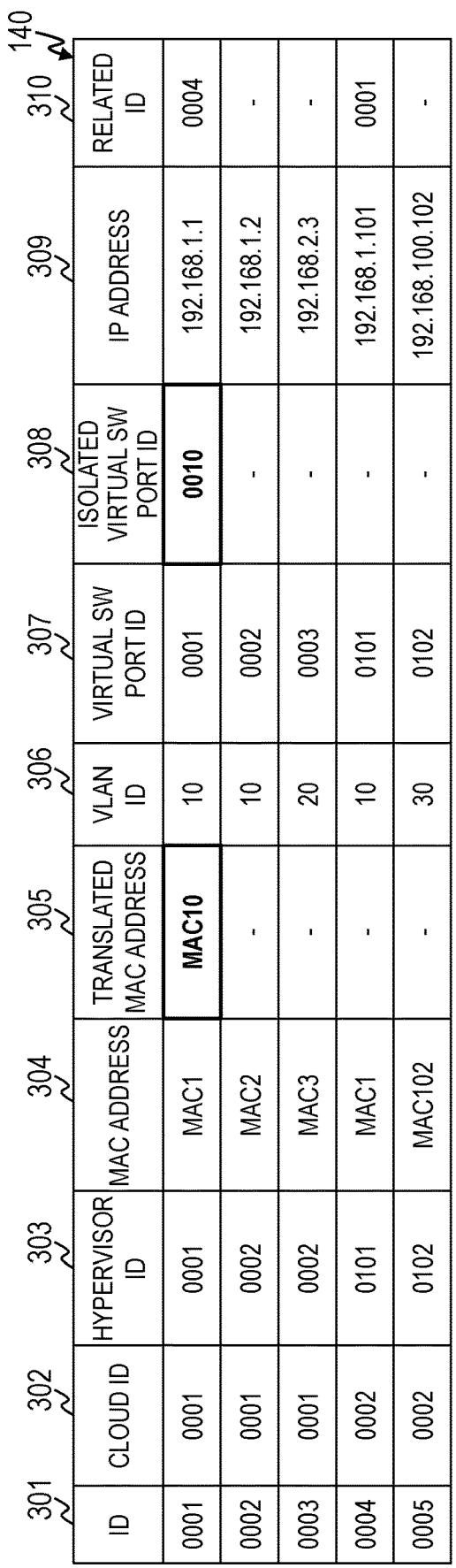

As a result of the processing described above, the network configuration information 140 is updated as shown in FIG. 10B.

The MAC address duplication monitoring module (A) 130 synchronizes the network configuration information 140 with the MAC address duplication monitoring module (B) 130 of the cloud infrastructure (B) 100 at the next execution cycle, and as a result, holds the network configuration information 140 shown in FIG. 10C.

The duplication correction server (A) 160 updates the MAC address translation information 180 as shown in FIG. 11 based on the duplication correction request. Further, the duplication correction server (A) 160 transmits a GARP in which "MAC 10" is set for the virtual machine (A) 150 and the virtual machine (B) 150 belonging to the virtual network having the VLAN ID of "10".

The data processing on the cloud infrastructure (B) 100 side is described. The MAC address duplication monitoring module (B) 130 obtains the MAC address information from the cloud infrastructure (B) 100, and as a result, the MAC address duplication monitoring module (B) 130 holds the network configuration information 140 shown in FIG. 3B. In this case, the determination results of Step S102 and Step S105 are both "NO".

The MAC address duplication monitoring module (B) 130 synchronizes the network configuration information 140 with the MAC address duplication monitoring module (A) 130 of the cloud infrastructure (A) 100, and as a result, holds the network configuration information 140 shown in FIG. 12A. In this case, "MAC 1" in the records having the ID 301 of "0001" and the ID 301 of "0003" is duplicated, and therefore the determination result in Step S108 is "YES".

In Step S109, the MAC address duplication monitoring module (B) 130 generates "MAC 20" as a translated MAC address. The MAC address duplication monitoring module (B) 130 sets "MAC 20" in the translated MAC address 305 of the record corresponding to the duplication virtual machine (B) 150 of the own cloud infrastructure (B) 100, that is, the record having the ID 301 of "0001". Further, the MAC address duplication monitoring module (B) 130 sets "0003" in the related ID 310 of the record, and sets "0001" in the related ID 310 of the record having the ID 301 of "0003".

In Step S110, the MAC address duplication monitoring module (B) 130 transmits a duplication correction request to the duplication correction server (B) 160. In a case where the MAC address duplication monitoring module (B) 130 receives notification of the port number "0110" of the isolated virtual switch 171 from the duplication correction server (B) 160, the MAC address duplication monitoring module (B) 130 sets "0110" in the isolated virtual switch port ID 308 of the record corresponding to the duplication virtual machine (B) 150 of the own cloud infrastructure (B) 100.

As a result of the processing described above, the network configuration information 140 is updated as shown in FIG. 12B.

The MAC address duplication monitoring module (B) 130 synchronizes the network configuration information 140 with the MAC address duplication monitoring module (A) 130 of the cloud infrastructure (A) 100 at the next execution cycle, and as a result, holds the network configuration information 140 shown in FIG. 12C.

The duplication correction server (B) 160 updates the MAC address translation information 180 as shown in FIG. 13 based on the duplication correction request. Further, the duplication correction server (B) 160 transmits a GARP in which "MAC 20" is set for the virtual machine (B) 150 and the virtual machine (A) 150 belonging to the virtual network having the VLAN ID of "10".

Figure 14A:
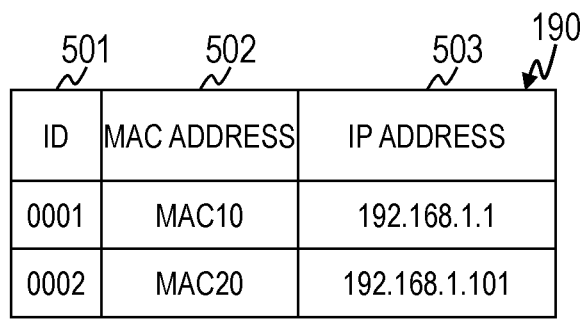
FIG. 14A and FIG. 14B are tables for showing an example of data structure of the ARP information in the first embodiment.
Figure 14B:
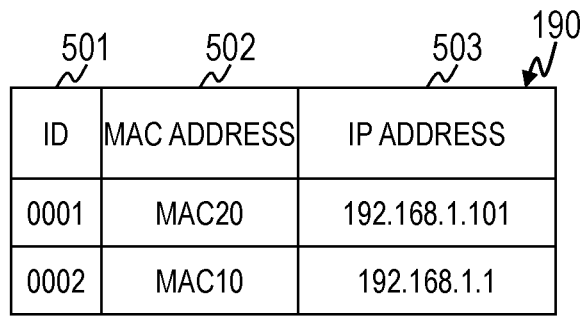

As a result of the GARP transmitted by the duplication correction server (A) 160 and the duplication correction server (B) 160, the duplication virtual machine (A) 150 holds the ARP information 190 shown in FIG. 14A, and the duplication virtual machine (B) 150 holds the ARP information 190 shown in FIG. 14B.

Next, there is described data processing to be executed in a case where duplication of MAC addresses is resolved.

The data processing on the cloud infrastructure (A) 100 side is described. The MAC address duplication monitoring module 130 (A) synchronizes the network configuration information 140 with the MAC address duplication monitoring module (B) 130 of the cloud infrastructure (B) 100, and as a result, holds the network configuration information 140 shown in FIG. 15A. In this case, the duplication of the MAC addresses of the records having the ID 301 of "0001" and the ID 301 of "0004" is resolved, and therefore the determination result in Step S111 is "YES".

In Step S112, the MAC address duplication monitoring module (A) 130 transmits a release request to the duplication correction server 160 (A). The MAC address duplication monitoring module (A) 130 deletes the values of the translated MAC address 305, the isolated virtual switch port ID 308, and the related ID 310 of the record having the ID 301 of "0001". Further, the MAC address duplication monitoring module (A) 130 deletes the value of the relevant ID 310 of the record having the ID 301 of "0004". As a result of the processing, the network configuration information 140 is updated as shown in FIG. 15B.

Figure 15C:
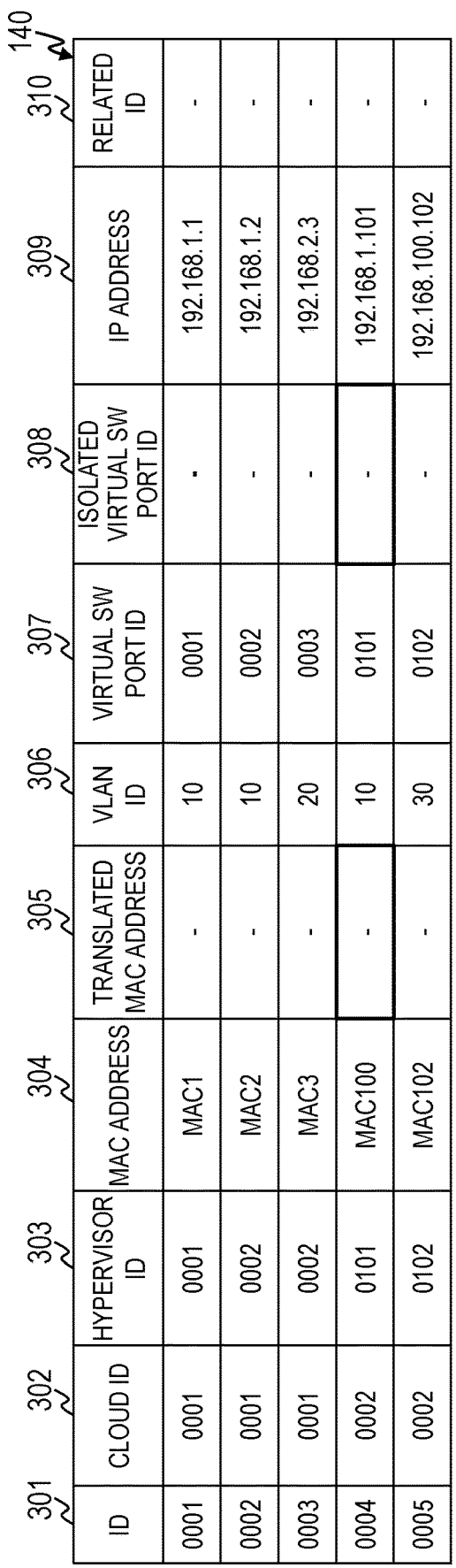

The MAC address duplication monitoring module (A) 130 synchronizes the network configuration information 140 with the MAC address duplication monitoring module (B) 130 of the cloud infrastructure (B) 100 at the next execution cycle, and as a result, holds the network configuration information 140 shown in FIG. 15C.

The duplication correction server (A) 160 deletes, based on the release request, the record having "MAC 1" set in the MAC address 404. Further, the duplicate correction server (A) 160 transmits a GARP in which "MAC 1" is set to the virtual machine (A) 150 and the virtual machine (B) 150 belonging to the virtual network having the VLAN ID of "10".

The data processing on the cloud infrastructure (B) 100 side is described. The MAC address duplication monitoring module 130 (B) synchronizes the network configuration information 140 with the MAC address duplication monitoring module (A) 130 of the cloud infrastructure (A) 100, and as a result, holds the network configuration information 140 shown in FIG. 16A. In this case, the duplication of the MAC addresses of the records having the ID 301 of "0001" and the ID 301 of "0003" is resolved, and therefore the determination result in Step S111 is "YES".

In Step S112, the MAC address duplication monitoring module (B) 130 transmits a release request to the duplication correction server (B) 160. The MAC address duplication monitoring module (B) 130 deletes the values of the translated MAC address 305, the isolated virtual switch port ID 308, and the related ID 310 of the record having the ID 301 of "0001". Further, the MAC address duplication monitoring module (B) 130 deletes the value of the relevant ID 310 of the record having the ID 301 of "0003". As a result of the processing, the network configuration information 140 is updated as shown in FIG. 16B.

Figure 16C:
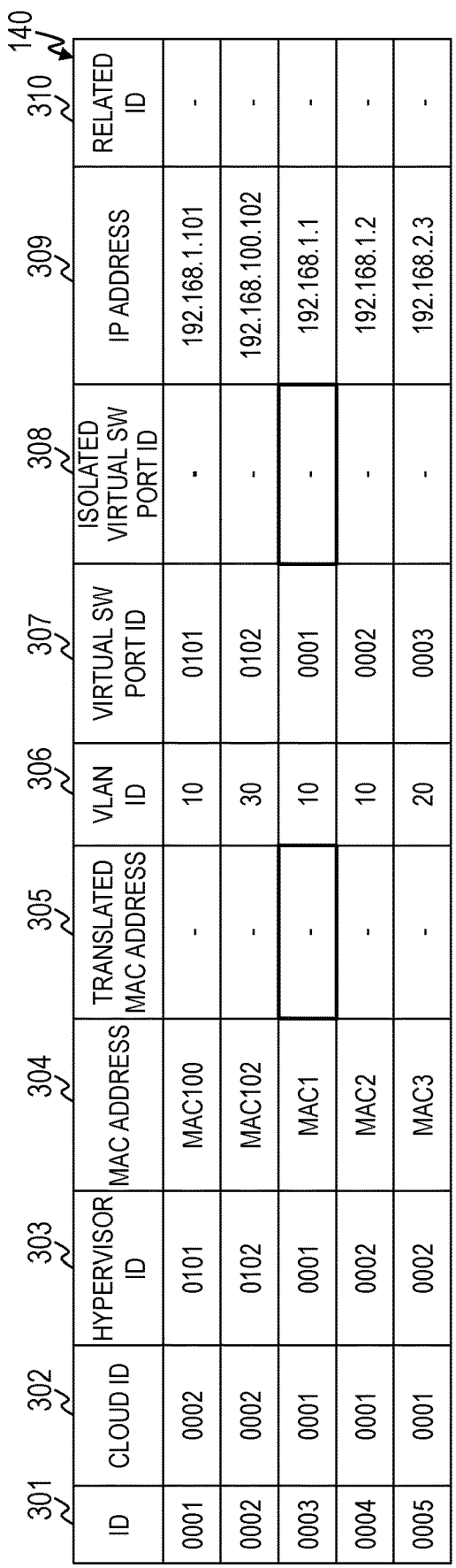

The MAC address duplication monitoring module (B) 130 synchronizes the network configuration information 140 with the MAC address duplication monitoring module (A) 130 of the cloud infrastructure (A) 100 at the next execution cycle, and as a result, holds the network configuration information 140 shown in FIG. 16C.

The duplication correction server (B) 160 deletes, based on the release request, the record having "MAC 1" set in the MAC address 404. Further, the duplicate correction server (B) 160 transmits a GARP in which "MAC 100" is set to the virtual machine (B) 150 and the virtual machine (A) 150 belonging to the virtual network having the VLAN ID of "10".

Figure 17A:
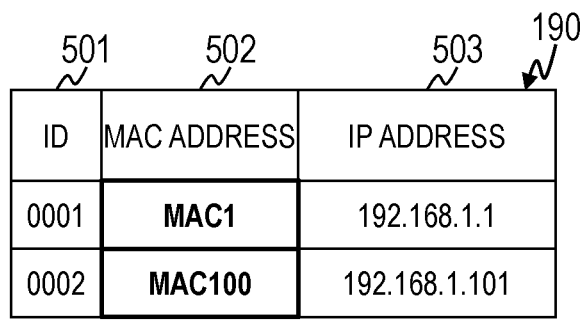
FIG. 17A and FIG. 17B are tables for showing an example of data structure of the ARP information in the first embodiment.
Figure 17B:
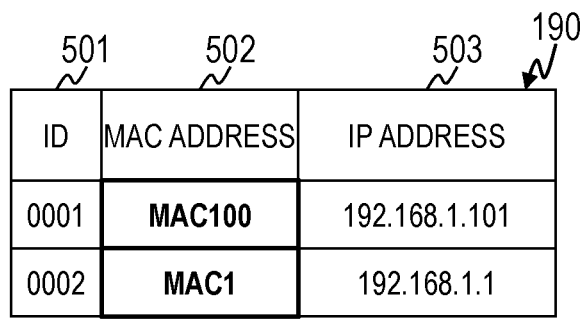

As a result of the GARP transmitted by the duplication correction server (A) 160 and the duplication correction server (B) 160, the duplication virtual machine (A) 150 holds the ARP information 190 shown in FIG. 17A, and the duplication virtual machine (B) 150 holds the ARP information 190 shown in FIG. 17B.

In the at least one embodiment of this invention, communication failure due to duplication of MAC addresses can be avoided. Further, the at least one embodiment of this invention has the following effects.

(1) In the at least one embodiment of this invention, even in a case in which the MAC address assigned to the virtual machine 150 is not changeable, communication failure due to duplication of MAC addresses can be avoided.

(2) This the at least one embodiment of invention can handle cases in which the duplication virtual machine 150 exists in a different cloud infrastructure 100 as well as cases in which the duplication virtual machine 150 exists in the same cloud infrastructure 100. Therefore, in a case where the duplication virtual machine 150 migrates, the same control is performed in the cloud infrastructure 100 of the migration destination, and therefore a communication disconnection after the migration can be avoided.

(3) In the at least one embodiment of this invention, the duplication correction server 160 controls only the communication of a duplication virtual machine 150, and therefore does not affect the communication of other virtual machines 150. Therefore, in a case where a virtual machine 150 that does not have a duplicated MAC address is migrated between cloud infrastructures 100, the MAC address of the virtual machine 150 is not changed, and therefore communication can be continued.

(4) In the at least one embodiment of this invention, it is only required to perform setting so that a duplication correction server 160 communicates by using a translated MAC address, and therefore L2 coupling can be maintained without changing the settings of the virtual switch 170 and the switch 102.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A communication control method for a computer system, the computer system comprising a plurality of cloud infrastructures, each of the plurality of cloud infrastructures including a plurality of computers, each of the plurality of computers including a hypervisor configured to manage a virtual machine created by using a resource of the each of the plurality of computers, the virtual machine having a MAC address assigned thereto, the hypervisor including a duplication correction virtual machine operating thereon, the duplication correction virtual machine being configured to control communication of a duplication virtual machine to which the same MAC address as the MAC address assigned to another virtual machine is assigned, each of the plurality of cloud infrastructures further including a MAC address duplication monitoring module configured to monitor duplication of the MAC address of each of the virtual machines of the each of the plurality of cloud infrastructure and of another cloud infrastructure, the communication control method including:

a first step of generating, by the MAC address duplication monitoring module, a translated MAC address in a case of detecting duplication of the MAC address;

a second step of transmitting, by the MAC address duplication monitoring module, a duplication correction request including the translated MAC address to one of the plurality of computers on which the duplication virtual machine operates;

a third step of generating, by the duplication correction virtual machine, translation information in which the MAC address assigned to the duplication virtual machine and the translated MAC address are associated with each other in a case of receiving the duplication correction request; and a fourth step of controlling, by the duplication correction virtual machine, communication between the duplication virtual machine and another virtual machine by using the translation information, wherein the MAC address duplication monitoring module is configured to hold network configuration information for managing the MAC address set in the virtual machine of each of the plurality of cloud infrastructures, wherein the first step includes a step of determining, by the MAC address duplication monitoring module, whether the duplicated MAC address exists based on the network configuration information, and wherein the communication control method further includes:

a step of collecting, by the MAC address duplication monitoring module, information on the MAC address assigned to each virtual machine operating on the plurality of computers included in one of the plurality of cloud infrastructures including the MAC address duplication monitoring module, and updating the network configuration information; and a step of synchronizing, by the MAC address duplication monitoring module, the network configuration information held by the MAC address duplication monitoring module of each of the plurality of cloud infrastructures.

2. The communication control method according to claim 1, further including:

a fifth step of monitoring, by the MAC address duplication monitoring module, based on the network configuration information, whether the MAC address assigned to the duplication virtual machine has been changed;

a sixth step of transmitting, by the MAC address duplication monitoring module, a release request to one of the plurality of computers on which the duplication virtual machine operates in a case of detecting that the MAC address assigned to the duplication virtual machine has been changed; and a seventh step of deleting, by the duplication correction virtual machine, the translation information in a case of receiving the release request.

3. The communication control method according to claim 2,
- wherein the hypervisor includes a virtual switch for coupling to a virtual network and an isolated virtual switch for coupling to the duplication correction virtual machine,
- wherein the hypervisor is configured to perform setting such that the duplication correction virtual machine is coupled to the virtual switch and the isolated virtual switch,
- wherein the hypervisor is configured to perform setting so that, in a case where a virtual machine is created, the virtual machine is coupled to the virtual switch,
- wherein the third step includes a step of outputting, by the duplication correction virtual machine, to the hypervisor a change instruction to couple the duplication virtual machine to the isolated virtual switch, and
- wherein the seventh step includes a step of outputting, by the duplication correction virtual machine, to the hypervisor a change instruction to couple the duplication virtual machine to the virtual switch.

4. The communication control method according to claim 3, wherein the fourth step includes:
- a step of translating, by the duplication correction virtual machine, in a case where a packet including the MAC address assigned to the duplication virtual machine is received via the isolated virtual switch, the MAC address included in the packet to the translated MAC address based on the translation information, and transmitting the packet to another virtual machine via the virtual switch; and
- a step of translating, by the duplication correction virtual machine, in a case where a packet including the translated MAC address is received via the isolated virtual switch, the translated MAC address included in the packet to the MAC address assigned to the duplication virtual machine based on the translation information, and transmitting the packet to the duplication virtual machine.

5. The communication control method according to claim 2,
- wherein the hypervisor includes a virtual switch for coupling to a virtual network and an isolated virtual switch for coupling to the duplication correction virtual machine,
- wherein the hypervisor is configured to perform setting so that the duplication correction virtual machine is coupled to the virtual switch and the isolated virtual switch,
- wherein the hypervisor is configured to perform setting so that, in a case where a virtual machine is created, the virtual machine is coupled to the virtual switch,
- wherein the second step includes a step of outputting, by the MAC address duplication monitoring module, to the hypervisor a change instruction to couple the duplication virtual machine to the isolated virtual switch, and
- wherein the sixth step includes a step of outputting, by the MAC address duplication monitoring module, to the hypervisor a change instruction to couple the duplication virtual machine to the virtual switch.

6. The communication control method according to claim 5, wherein the fourth step includes:
- a step of translating, by the duplication correction virtual machine, in a case where a packet including the MAC address assigned to the duplication virtual machine is received via the isolated virtual switch, the MAC address included in the packet to the translated MAC address based on the translation information, and transmitting the packet to another virtual machine via the virtual switch; and
- a step of translating, by the duplication correction virtual machine, in a case where a packet including the translated MAC address is received via the isolated virtual switch, the translated MAC address included in the packet to the MAC address assigned to the duplication virtual machine based on the translation information, and transmitting the packet to the duplication virtual machine.

7. A computer system, comprising a plurality of cloud infrastructures,
- each of the plurality of cloud infrastructures including a plurality of computers,
- each of the plurality of computers including a hypervisor configured to manage a virtual machine created by using a resource of the each of the plurality of computers,
- the virtual machine having a MAC address assigned thereto,
- the hypervisor including a duplication correction virtual machine operating thereon, the duplication correction virtual machine being configured to control communication of a duplication virtual machine to which the same MAC address as the MAC address assigned to another virtual machine is assigned,
- each of the plurality of cloud infrastructures further including a MAC address duplication monitoring module configured to monitor duplication of the MAC address of each of the virtual machines of the each of the plurality of cloud infrastructure and of another cloud infrastructure,
- the MAC address duplication monitoring module being configured to:
- generate a translated MAC address in a case of detecting duplication of the MAC addresses; and
- transmit a duplication correction request including the translated MAC address to one of the plurality of computers on which the duplication virtual machine operates,
- the duplication correction virtual machine being configured to:
- generate translation information in which the MAC address assigned to the duplication virtual machine and the translated MAC address are associated with each other in a case of receiving the duplication correction request; and
- control communication between the duplication virtual machine and another virtual machine by using the translation information,
- wherein the MAC address duplication monitoring module is configured to:
- hold network configuration information for managing the MAC address set in the virtual machine of each of the plurality of cloud infrastructures;
- determine whether the duplicated MAC address exists based on the network configuration information;
- collect information on the MAC address assigned to each virtual machine operating on the plurality of computers included in one of the plurality of cloud infrastructures including the MAC address duplication monitoring module, and update the network configuration information; and synchronize the network configuration information held by the MAC address duplication monitoring module of each of the plurality of cloud infrastructures.

8. The computer system according to claim 7,
wherein the MAC address duplication monitoring module is configured to:
monitor, based on the network configuration information, whether the MAC address assigned to the duplication virtual machine has been changed; and
transmit a release request to one of the plurality of computers on which the duplication virtual machine operates in a case of detecting that the MAC address assigned to the duplication virtual machine has been changed,
wherein the duplication correction virtual machine is configured to delete the translation information in a case of receiving the release request.

9. The computer system according to claim 8,
wherein the hypervisor includes a virtual switch for coupling to a virtual network and an isolated virtual switch for coupling to the duplication correction virtual machine,
wherein the hypervisor is configured to perform setting so that the duplication correction virtual machine is coupled to the virtual switch and the isolated virtual switch,
wherein the hypervisor is configured to perform setting so that, in a case where a virtual machine is created, the virtual machine is coupled to the virtual switch, and
wherein the duplication correction virtual machine is configured to:
output, to the hypervisor, a change instruction to couple the duplication virtual machine to the isolated virtual switch in a case of receiving the duplication correction request; and
output, to the hypervisor, a change instruction to couple the duplication virtual machine to the virtual switch in a case of receiving the release request.

10. The computer system according to claim 9, wherein the duplication correction virtual machine is configured to:
translate, in a case where a packet including the MAC address assigned to the duplication virtual machine is received via the isolated virtual switch, the MAC address included in the packet to the translated MAC address based on the translation information, and transmit the packet to another virtual machine via the virtual switch; and
translate, in a case where a packet including the translated MAC address is received via the isolated virtual switch, the translated MAC address included in the packet to the MAC address assigned to the duplication virtual machine based on the translation information, and transmit the packet to the duplication virtual machine.

11. The computer system according to claim 8,
wherein the hypervisor includes a virtual switch for coupling to a virtual network and an isolated virtual switch for coupling to the duplication correction virtual machine,
wherein the hypervisor is configured to perform setting so that the duplication correction virtual machine is coupled to the virtual switch and the isolated virtual switch,
wherein the hypervisor is configured to perform setting so that, in a case where a virtual machine is created, the virtual machine is coupled to the virtual switch, and
wherein the MAC address duplication monitoring module is configured to:
output, together with the duplication correction request, to the hypervisor, a change instruction to couple the duplication virtual machine to the isolated virtual switch; and
output, together with the release request, to the hypervisor, a change instruction to couple the duplication virtual machine to the virtual switch.

12. The computer system according to claim 11, wherein the duplication correction virtual machine is configured to:
translate, in a case where a packet including the MAC address assigned to the duplication virtual machine is received via the isolated virtual switch, the MAC address included in the packet to the translated MAC address based on the translation information, and transmit the packet to another virtual machine via the virtual switch; and
translate, in a case where a packet including the translated MAC address is received via the isolated virtual switch, the translated MAC address included in the packet to the MAC address assigned to the duplication virtual machine based on the translation information, and transmit the packet to the duplication virtual machine.

13. A computer, which is included in a cloud infrastructure, the computer comprising:
a processor;
a network interface; and
a memory, the memory storing instructions that when executed by the processor, configures the processor to:
create a virtual machine by using a resource of the computer, and assign a MAC address to the virtual machine;
monitor a MAC address of each of the virtual machine operating on a computer included in the cloud infrastructure in which the computer is included and each of the virtual machine operating on a computer included in another cloud infrastructure coupled to the cloud infrastructure;
generate a translated MAC address in a case of detecting duplication of the MAC address;
generate translation information in which the duplicated MAC address and the translated MAC address are associated with each other;
control communication between the virtual machine to which the duplicated MAC address is assigned and another virtual machine by using the translation information;
hold network configuration information for managing the MAC address set in the virtual machine of each of the plurality of cloud infrastructures;
determine whether the duplicated MAC address exists based on the network configuration information;
collect information on the MAC address assigned to each virtual machine operating on the plurality of computers included in one of the plurality of cloud infrastructures, and update the network configuration information; and
synchronize the network configuration information held by each of the plurality of cloud infrastructures.

* * * * *